United States Patent
Inou (10) Patent No.: US 7,457,485 B2
(45) Date of Patent: Nov. 25, 2008

(54) IMAGE PROCESSING APPARATUS FOR CLASSIFYING AND STORING IMAGES AND CAPABLE OF FORMING REDUCED IMAGES

(75) Inventor: Kazuya Inou, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/732,596

(22) Filed: Dec. 10, 2003

(65) Prior Publication Data

US 2004/0119846 A1    Jun. 24, 2004

(30) Foreign Application Priority Data

Dec. 13, 2002    (JP)    ............... 2002-362237

(51) Int. Cl.
- G06K 9/54    (2006.01)
- G06K 9/60    (2006.01)
- H04N 1/00    (2006.01)

(52) U.S. Cl. .................... 382/305; 358/403
(58) Field of Classification Search ............... 382/299, 382/305; 358/403, 404; 707/1
See application file for complete search history.

(56) References Cited

U.S. PATENT DOCUMENTS 6,868,192 B2 *    3/2005    Takiguchi .................. 382/299

FOREIGN PATENT DOCUMENTS

| JP | 09-114845 A | 5/1997 |
| JP | 10-028250 A | 1/1998 |
| JP | 2001-109877 A | 4/2001 |

OTHER PUBLICATIONS

Microsoft Windows XP, Oct. 2001, Microsoft, Screen Shoots and Help files.*
Microsoft Windows XP, Oct. 2001, Microsoft, updatate Screen shot of Figure 2.*
The above references were cited in a Jul. 15, 2008 Japanese Office Action issued in the counterpart Japanese Patent Application 2002-362237.

* cited by examiner

Primary Examiner—Matthew C Bella
Assistant Examiner—Randolph Chu
(74) Attorney, Agent, or Firm—Cowan, Liebowitz & Latman, P.C.

(57) ABSTRACT

An image processing apparatus comprises an image storage unit for classifying and storing images in a plurality of storage locations, a reduced image forming unit for forming reduced images based on the images, a display controller for displaying, on display means, the reduced images of the images stored by the image storage unit, and images representing storage locations, and an instruction unit for designating a storage location for an image, wherein the display control unit changes an image representing the storage location designated by the instruction unit to a reduced image corresponding to the image stored at the storage location.

12 Claims, 6 Drawing Sheets

IMAGE PROCESSING APPARATUS FOR CLASSIFYING AND STORING IMAGES AND CAPABLE OF FORMING REDUCED IMAGES

BACKGROUND OF THE INVENTION

1. Field of the Invention

The present invention relates to an image processing apparatus for classifying and storing a plurality of images, and to an image pickup apparatus.

2. Related Background Art

For classifying an image, a conventional image processing apparatus and a conventional image pickup apparatus, for example, display the file name of an image and the directory name of a directory for the image, and save the image in a directory designated by a user. This conventional technique is disclosed in Japanese Patent Application Laid-Open No. 2000-78517, for example.

However, when the conventional method is used, since information for a storage location is not displayed in a manner of image and only a directory name is displayed, it is difficult for a user to intuitively identify the information that refers to the storage location, and the classification of images becomes a troublesome process.

SUMMARY OF THE INVENTION

To resolve this shortcoming, it is an objective of the present invention to simplify the process for storing an image that is picked up.

To achieve this objective, according to one aspect of the present invention, an image processing apparatus comprises:

image storage means for classifying and storing images in a plurality of storage locations;

reduced image forming means for forming reduced images from the images;

display control means for displaying, on display means, the reduced images of the images stored by the image storage means, and images representing storage locations; and instruction means for designating a storage location for an image, wherein the display control means changes an image representing the storage location designated by the instruction means to a reduced image corresponding to the image stored at the storage location.

According to another aspect of the invention, provided is an image processing apparatus wherein, when an image is stored (or output) after being recorded, a reduced image representing the storage location (or the output destination) is displayed, so that a user can easily perform a storage process for managing the image, and also provided is an image pickup device wherein, when an image is stored (or output) after being picked up, a reduced image representing the storage location (or the output destination) is displayed, so that a user can easily perform the storage process for the image that is obtained.

Other objectives and features of the present invention will become apparent in due time during the course of the following explanation given for the relevant specification and drawings.

DETAILED DESCRIPTION OF THE PREFERRED EMBODIMENTS

An image processing apparatus and an image pickup apparatus according to the preferred embodiments of the present invention will now be described while referring to the accompanying drawings.

First Embodiment

An image processing apparatus is the subject of the configuration of a first embodiment.

Figure 1:
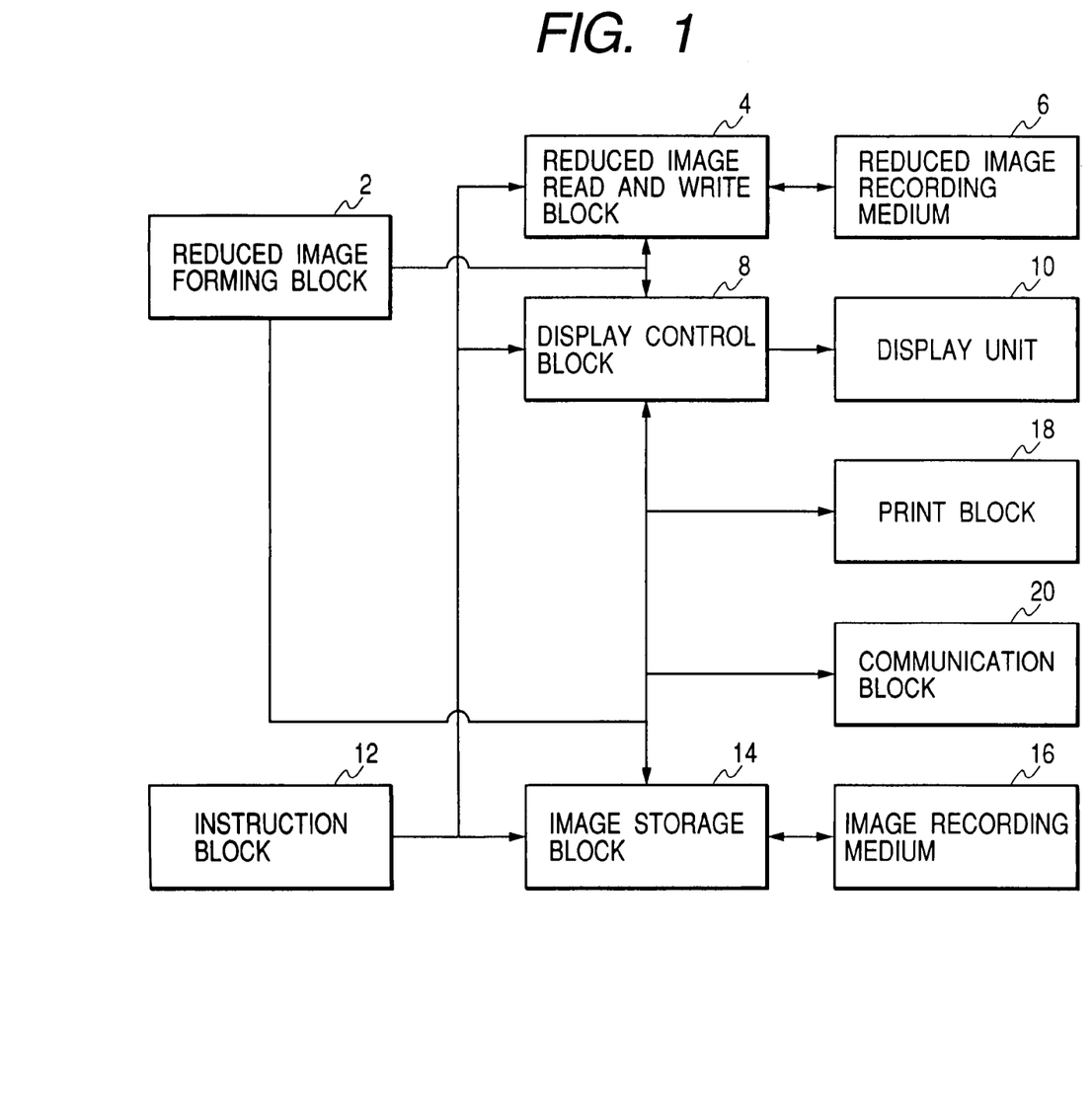
FIG. 1 is a block diagram showing the essential configuration of an image processing apparatus according to a first embodiment of the present invention.

FIG. 1 is a block diagram showing the essential configuration of the image processing apparatus according to the first embodiment of the invention.

In FIG. 1, a reduced image forming block 2 forms a reduced image of each image that is stored. A reduced image read and write block 4 classifies and stores on a reduced image recording medium 6, the reduced image and the reduced image display information that are formed by the reduced image forming block 2, and reads out a reduced image from the reduced image recording medium 6. The reduced image recording medium 6 is used by the reduced image read and write block 4 to record the reduced image and the reduced image display information.

A display control block 8 permits a display unit 10, such as a liquid crystal panel, to display a reduced image representing the storage location of an image stored in the image recording medium 16. The reduced image displayed on the display unit 10 is a typical reduced image representing the storage location of an image that is stored on the image recording medium 16 and that is formed by reducing the size of one of the images that have already been stored at the storage location. This reduced image is recorded on the reduced image recording medium 6. A reduced image is read out and displayed in accordance with the reduced image and the corresponding reduced image display information, stored on the reduced image recording medium 6.

The display unit 10, such as a liquid crystal display panel, is used to display an image to be stored, an image representing a storage location, and a marker employed by a user to designate a storage location while using an instruction block 12. The instruction block 12 can be, for example, a joystick, a track ball or a cross-shaped key a user can employ to select and designate an image to be stored and an appropriate storage location. An image storage block 14 writes an image into a storage location designated by the instruction unit 12, or reads out an image therefrom. While the image storage block 14 is used to record images on the image recording medium 16, a print block 18 prints an image recorded on the image recording medium 16, and a communication block 20 externally transmits a recorded image recorded on the image recording medium 16.

The same medium may be used for the reduced image recording medium 6 and the image recording medium 16, and an arbitrary type and shape may be employed for these media.

Figure 2A:
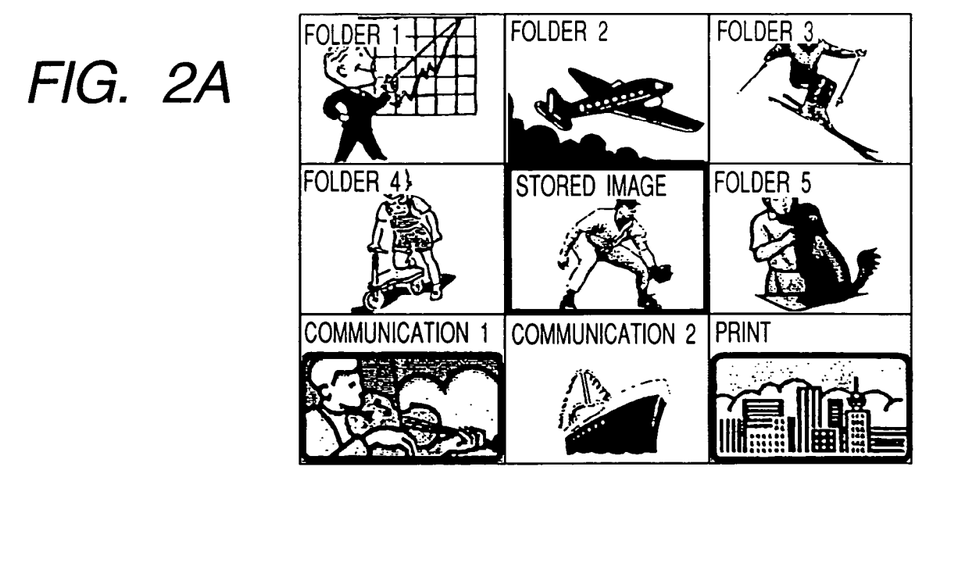
FIGS. 2A and 2B are diagrams for explaining example screens on which reduced images are displayed when an image is stored by the image processing apparatus according to the first embodiment of the invention.
Figure 2B:
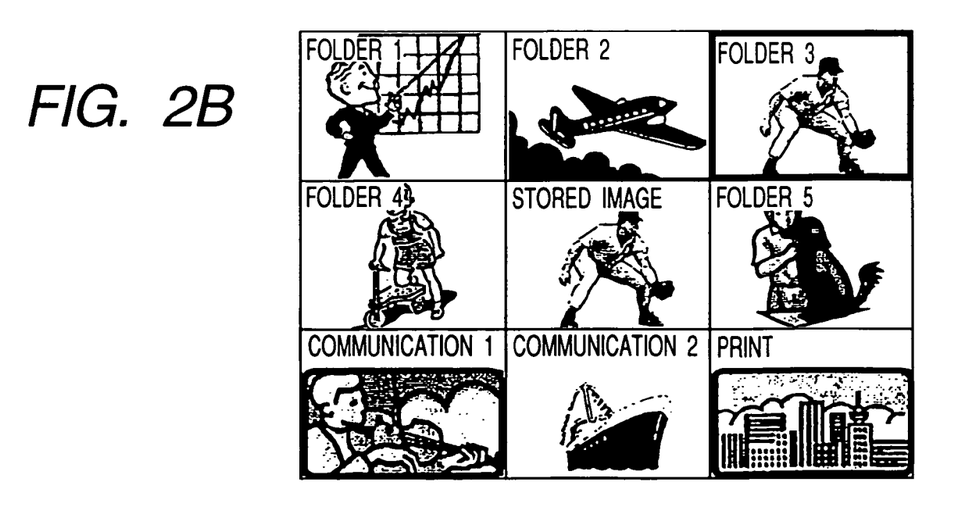

FIGS. 2A and 2B are diagrams for explaining example screens wherein reduced images are displayed when images are stored by the image processing apparatus according to the first embodiment.

That is, this operation corresponds to the image storage operation, and example reduced images displayed on the display unit 10 are shown.

In FIG. 2A, reduced images are shown in an M×N matrix form (both M and N are odd numbers), i.e., in a 3×3 shaped matrix form in this embodiment. The reduced image of an image that a user desires to store is displayed in the center of the display area, where it is encircled by a solid frame that is used to indicate a location selected by a user. A marker other than the solid frame may also be employed so long as it adequately identifies the user's selected location.

Further, reduced images representing storage locations (e.g., FOLDER 1 and FOLDER 2), a printing destination (PRINT) and communication destinations (e.g., COMMUNICATION 1 and COMMUNICATION 2) are displayed around the reduced image to be stored.

In the present embodiment, in order to represent a storage location for an image on the recording medium 16, the reduced image is formed based on one of the images that have already been stored in the storage location, and is displayed.

For this display process, the last image that was stored at the storage location may be selected from among a plurality of images that have been stored in the storage location, and the reduced image of this image is displayed.

Similarly, for an image representing the printing destination or the communication destination, the last image that was printed or transmitted/received is selected and the reduced image of this image is displayed.

When the user has employed the instruction block 12 to select the storage location for the image, the display screen in FIG. 2B appears. Included in the instruction block 12 is a function for moving the position of the marker to select the storage location, and a function for permitting the user to select and designate the location of the marker when it matches the storage location desired by the user.

In the state in FIG. 2A, wherein the image is to be stored, the marker is displayed on the image at the center (when this image is selected, the storage operation has not yet been initiated). Then, when the user employs the instruction block 12 to move the marker to the location of the reduced image, and designates the storage location as folder 3, the selected image is stored in folder 3 and the reduced image of folder 3 is updated as the reduced image of the image that is actually stored. In FIG. 2B, the centrally located image in FIG. 2A is displayed at the location for the reduced image representing folder 3.

Then, information that the image corresponding to folder 3 is the reduced image of the image that is currently stored is recorded on the reduced image recording medium 6.

The same instruction method is employed to designate another storage location, a communication destination and a printing destination (in FIGS. 2A and 2B, COMMUNICATION 1 and PRINT).

Figure 3A:
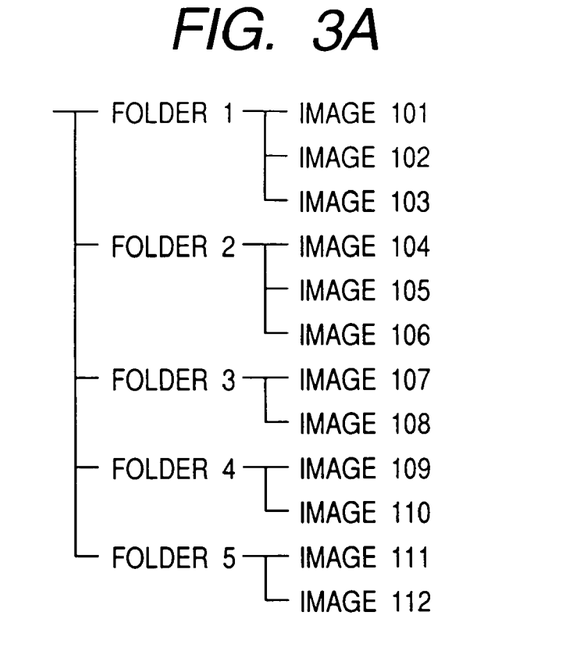
FIGS. 3A and 3B are diagrams for explaining example classifications for an image recording medium and a reduced image recording medium for the image processing apparatus according to the first embodiment of the invention.
Figure 3B:
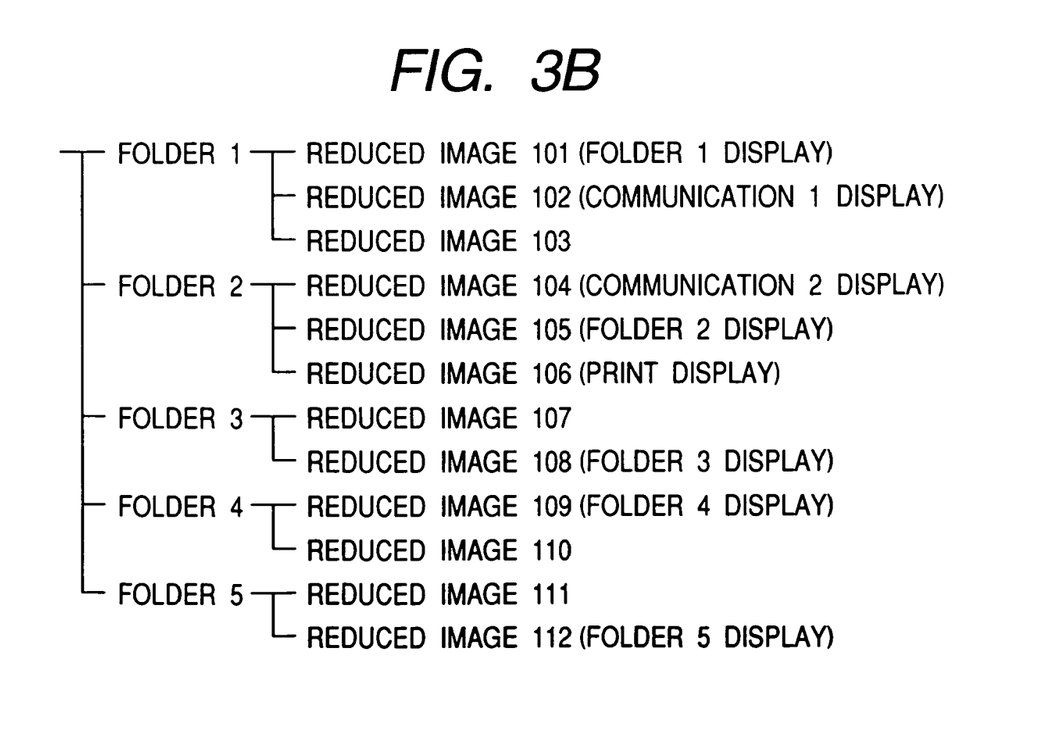

FIGS. 3A and 3B are diagrams for explaining example classifications for the image recording medium 16 and the reduced image recording medium 6 of the image processing apparatus according to the first embodiment of the invention.

That is, in FIGS. 3A and 3B, for the image stored in accordance with the first embodiment, images and reduced images are classified and stored in the image recording medium 16 and the reduced image recording medium 6.

In FIG. 3A is shown the state wherein the images are stored in the image recording medium 16. Multiple images 101 to 112 are recorded in a plurality of storage locations, i.e., folders 1 to 5.

In FIG. 3B is shown the state wherein reduced images are recorded in the reduced image recording medium 6, and as in FIG. 3A, multiple reduced images 101 to 112 are stored in a plurality of storage locations, i.e., folders 1 to 5. Numbers are provided for the images in FIGS. 3A and 3B, so that the reduced images are formed from images having corresponding numbers.

In addition, the reduced image read and write block 4 records, together with the reduced images, reduced image display information designating the reduced images that should be displayed as a storage location, a communication destination and a printing destination. To display images, the reduced images are read out in accordance with the reduced image display information, and as is shown in FIGS. 2A and 2B, are displayed on the display unit 10 by the display control block 8.

According to the method described above, since the reduced image representing the storage location is displayed, the user can easily perform the storage process to manage the image.

Furthermore, in order to store an externally input image in a desired folder in the image recording medium 16, the image storage block 14 records the image in a selected image storage location on the image recording medium 16, the reduced image forming block 2 forms a reduced image for this image, and the reduced image read and write block 4 writes the reduced image on the reduced image recording medium 6.

Therefore, when an image is to be recorded at a designated storage location, a corresponding reduced image and associated reduced image display information can be read out from the reduced image recording medium 6, and displayed on the display unit 10.

Second Embodiment

An image pickup apparatus is the subject of the configuration according to a second embodiment of the invention.

Figure 4:
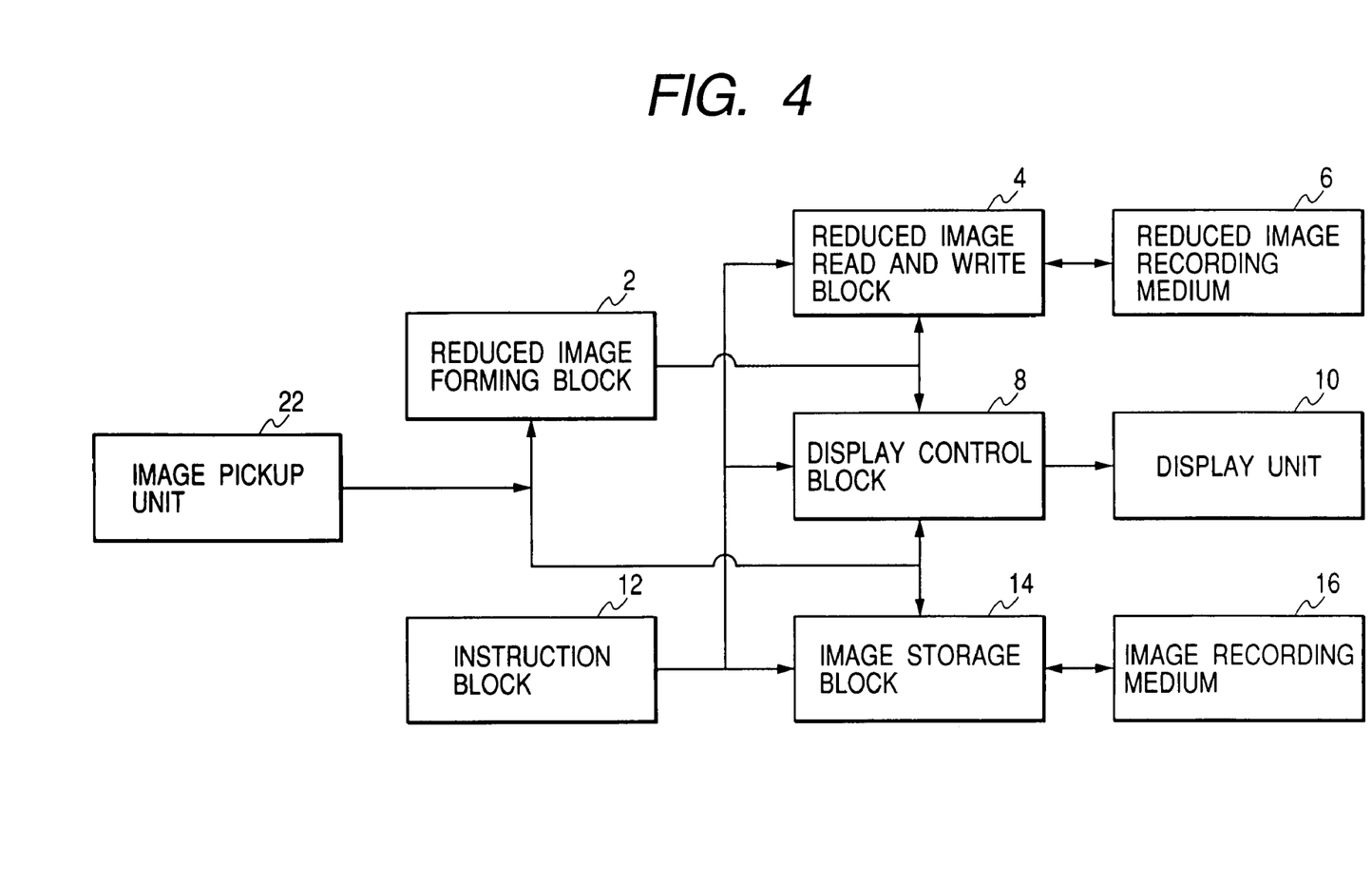
FIG. 4 is a block diagram showing the essential configuration of an image pickup apparatus according to a second embodiment of the invention.

FIG. 4 is a block diagram showing the essential configuration of an image pickup apparatus according to the second embodiment of the invention.

In FIG. 4, a reduced image forming block 2 forms a reduced image of an image that is picked up. A reduced image read and write block 4 classifies and records, on a reduced image recording medium 6, reduced images formed by the reduced image forming block 2 and corresponding reduced image display information, and reads out reduced images from the reduced image recording medium 6. The reduced image recording medium 6 is used by the reduced image read and write block 4 to record the reduced images and the reduced image display information, while a display control block 8 permits a display unit 10 to display reduced images that represent image storage locations of the image recording medium 16. Each of the reduced images displayed on the display unit 10 is a typical reduced image representing the image storage location of the image recording medium 16, and is formed by reducing one of the images stored at the storage location. This reduced image is recorded on the reduced image recording medium 6. A reduced image is read out and displayed in accordance with the reduced image and the reduced image display information, recorded on the reduced image recording medium 6. The display unit 10 is used by the display control block 8 to display an image that is picked up, an image that represents an output destination, and a marker that a user employs when using an instruction block 12 to designate an output destination. An image storage block 14 writes into an output destination designated by the instruction block 12, an image that is picked up, or reads the image therefrom. The image recording medium 16 is used by the image storage block 14 to record images, and an image pickup unit 22 picks up the image of an object and converts the image into an electric image.

The reduced image recording medium 6 and the image recording medium 16 may be the same medium.

Figure 5A:
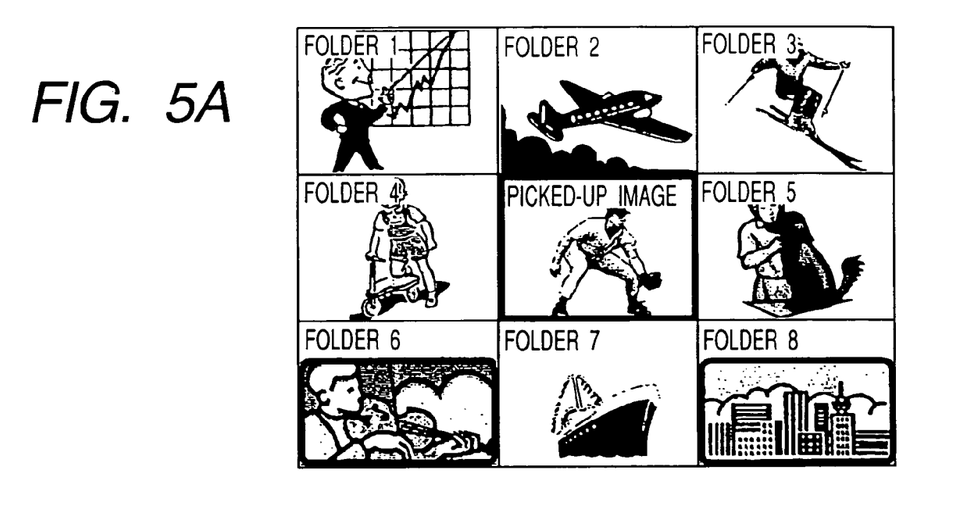
FIGS. 5A and 5B are diagrams for explaining example display screens when an image is stored by the image processing apparatus according to the second embodiment of the invention.
Figure 5B:
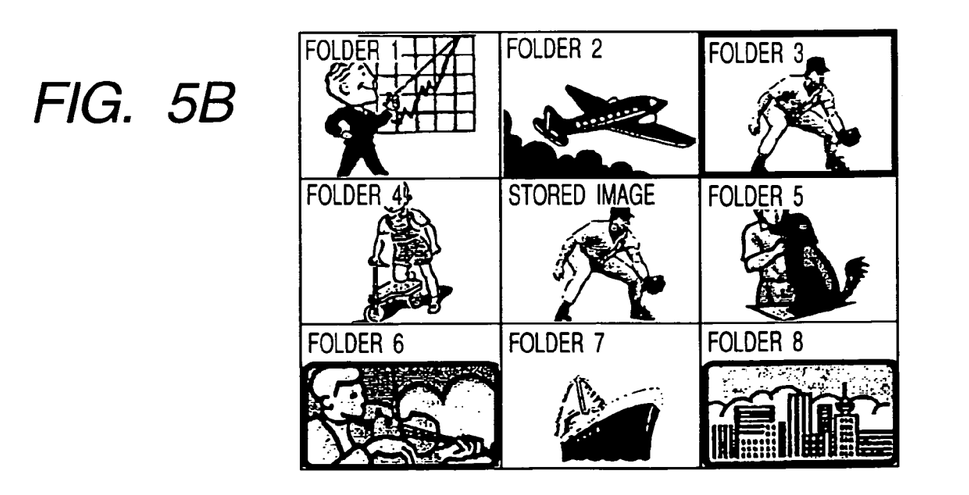

FIGS. 5A and 5B are diagrams for explaining example display screens when an image is stored by the image pickup apparatus according to the second embodiment of the invention.

That is, examples of reduced images displayed on the display unit 10 in the image storage operation for the second embodiment are shown.

In FIG. 5A, reduced images are shown in an M×N matrix form (both M and N are odd numbers), e.g., in a 3×3 matrix form in the present embodiment. A reduced image of an image that is picked up is shown at the center of the display area, and is encircled by a solid frame to represent the position selected by a user. A marker other than the solid frame may also be employed so long it can be used to identify the location selected by the user.

Further, reduced images representing storage locations (folder 6 and folder 8) are displayed so as to encircle the reduced image of the image that is picked up.

Each reduced image that represents a storage location is formed by using one of the images recorded at the storage location and is displayed.

For this display, from among a plurality of images at the storage location, for example, the last image that was stored at the storage location is selected, and the reduced image of this image is displayed.

In FIG. 5B is shown a display screen provided when the user employs the instruction block 12 to select an output destination of the image. The instruction block 12 has a function for moving the marker to select an output destination, and a function for permitting the user to select and designate the location of a marker when its location matches the output destination desired by the user.

In FIG. 5A, the marker is displayed at the location of the image located at the center of the display area. When the user employs the instruction block 12 to move the marker to the image representing the storage location with the display of folder 3, and designates this location, the reduced image of the folder 3 is updated to the reduced image of a currently stored image.

The same method is employed to designate another storage location.

Figure 6:
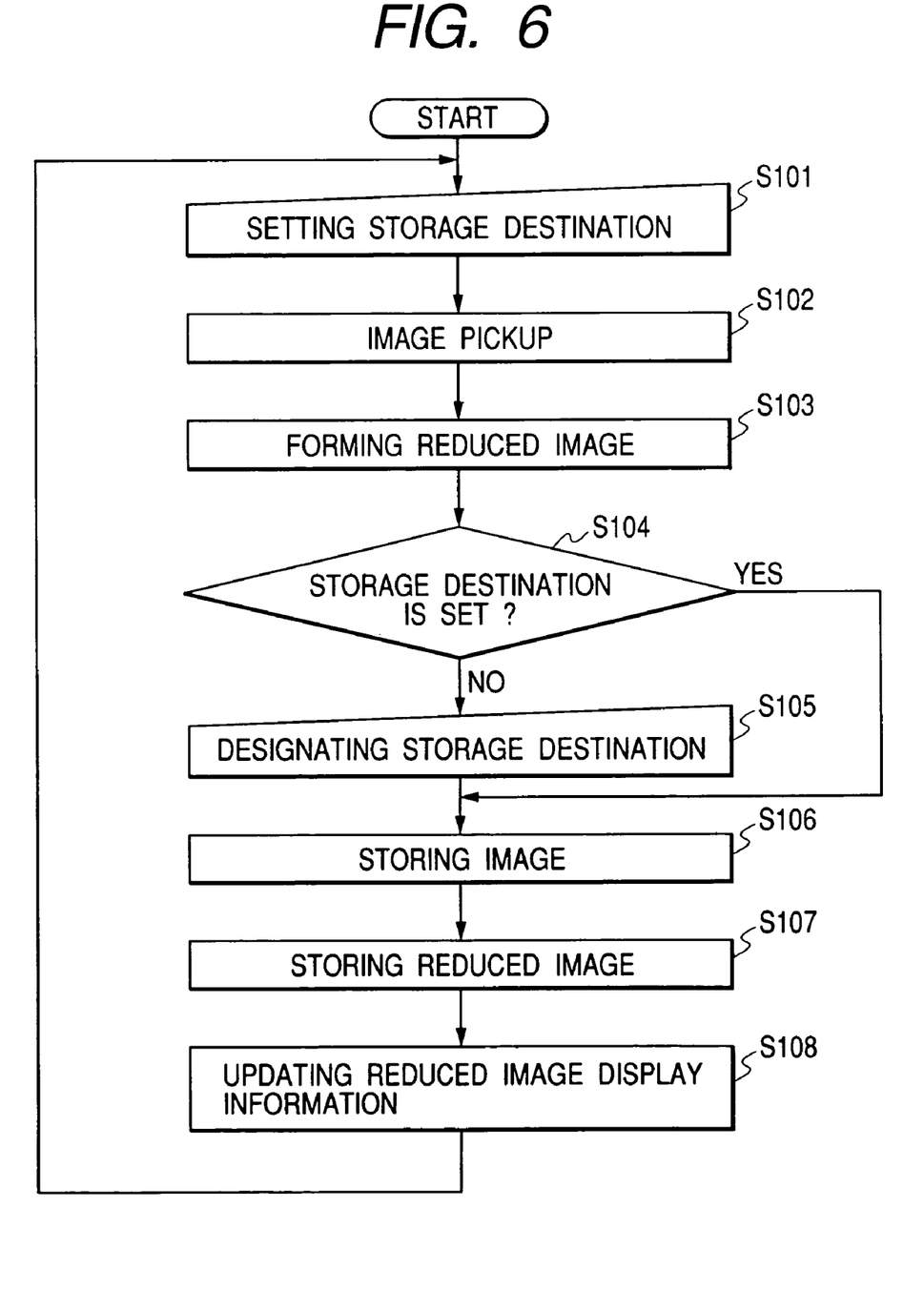
FIG. 6 is a flowchart showing the image storage or output processing performed by the image pickup apparatus according to the second embodiment of the invention.

FIG. 6 is a flowchart showing the image storage or output processing performed by the image pickup apparatus according to the second embodiment of the invention.

When an image of an object is to be picked up by the image pickup apparatus of the invention, first, a user can designate in advance the storage location of the image that is picked up (S101). An arbitrary location can be designated by using the setup method as described while referring to FIG. 5. When the location is designated, the reduced image read and write block 4 and the image storage block 14 store storage locations of an image that is picked up and a reduced image.

Then, the image pickup unit 12 picks up the image of an object (S102), and the reduced image forming block 2 forms a reduced image of the image that has been picked up (S103).

Next, a check is performed to determine whether the storage (output) location has been designated in advance (S104). When the storage location has not yet been designated, the user employs the instruction block 12 to designate the storage (output) location (S105). After the output (storage) location is designated, or when the output (storage) location has been designated in advance, the image storage block 14 stores the image in the designated storage location on the image recording medium 16 (S106).

Following this, the reduced image read and write block 4 writes or stores (outputs) the reduced image onto the reduced image recording medium 6 (S107), and updates the reduced image display information (S108).

As is described above, since the reduced image representing the storage location is displayed during the image pickup operation, the user can easily perform the output and storage processing that is required to handle or manage the image.

Further, when an arbitrary storage location is designated in advance, images that are picked up after that are automatically recorded in the designated storage location. When the designation of the output (storage) location is canceled, each image that is picked up can be output (stored) in an arbitrary output designation (or an arbitrary storage location).

According to the image processing apparatus of the invention, since the reduced image for the storage location is displayed when the recorded image is stored, the user can easily perform the classifying and the storage processing that are required to process the image.

According to the image pickup apparatus of the invention, since the reduced image for the output (storage) location is displayed when the picked-up image is output (stored), a user can easily perform the classifying and storage processing that are required for the image that is picked up.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
a read-out unit configured to read out an image stored by a storage unit;
a display control unit configured to display, on a display unit, a reduced image of the image read out by said read-out unit and at least one of a print instructing image for instructing to print the image read out by said read-out unit and a transmission instructing image for instructing to transmit the image read-out by said read-out unit;
an instruction unit configured to instruct to print the image read out by said read-out unit, by designating a print instructing area having a print instruction identifier and including therein the print instructing image displayed by said display control unit and/or instruct to transmit the image read out by said read-out unit, by designating a transmission instructing area having a transmission instruction identifier and including therein the transmission instructing image displayed by said display control unit; and an output unit configured to output the image instructed to be printed or transmitted by said instruction unit to a print apparatus or a transmission destination, wherein said display control unit displays images so as to display, as the print instructing image, a reduced image of an image which has been lastly output to the print apparatus, is identified by the print instruction identifier and is selected from among a plurality of stored images to be displayed, the print instruction identifier being displayed simultaneously with the print instructing image, and display, as the transmission instructing image, a reduced image of an image which has been lastly output to the transmission destination, is identified by the transmission instruction identifier and selected from among the plurality of stored images to be displayed the transmission instruction identifier being displayed simultaneously with the transmission instructing image.

2. An image processing apparatus according to claim 1, wherein said storage unit classifies and stores images in a plurality of storage locations, and wherein said display control unit displays the reduced image of the image lastly stored at the storage location, as an image representing the storage location.

3. An image processing apparatus according to claim 2, wherein said display control unit displays M×N reduced images on said display unit, while the reduced image of the image to be stored at the storage location is displayed at the center so that the reduced images representing the plurality of storage locations are displayed around the reduced image of the image to be stored.

4. An image pickup apparatus comprising:
an image pickup unit;
a display control unit configured to control a display unit to display a reduced image of an image read out from an image storage unit and at least one of a print instructing image for instructing to print the image read out from said image storage unit and a transmission instructing image for instructing to transmit the image read out from said image storage unit;
an instruction unit configured to instruct to print the image read out from said image storage unit, by designating a print instructing area having a print instruction identifier and including therein the print instructing image displayed by said display control unit and/or instruct to transmit the image read out from said image storage unit, by a designating the transmission instructing area having a transmission instruction identifier and including therein the transmission instructing image displayed by said display control unit; and
an output unit configured to output the image instructed to be printed or transmitted by said instruction unit to a print apparatus or a transmission destination,
wherein said output unit includes a unit configured to transmit the image to at least one of the print apparatus and a transmission unit configured to externally transmit the image, and said display control unit displays, as the print instructing image, a reduced image of an image which has been lastly output to the print apparatus, is identified by the print instruction identifier and selected from among a plurality of stored images to be displayed, the print instruction identifier being displayed simultaneously with the print instructing image, and display, as the transmission instructing image, a reduced image of an image which has been was lastly output to the transmission destination is identified by the transmission instruction identifier and selected from among the plurality of stored images to be displayed the transmission instruction identifier being displayed simultaneously with the transmission instructing image.

5. An image pickup apparatus according to claim 4, wherein said storage unit classifies and stores images in a plurality of storage locations, and wherein said display control unit displays the reduced image of the image which is lastly output by said output unit, as an image representing an output destination of said output unit.

6. An image pickup apparatus according to claim 5, wherein said display control unit displays M×N reduced images on said display unit, with a the reduced image of the image to be stored at the storage location being displayed at the center so that the images representing storage locations being displayed around the reduced image to be stored.

7. An image processing apparatus according to claim 1, wherein said display control unit automatically updates display of the print instructing image or the transmission instructing image in accordance with an output of said output unit.

8. An image pickup apparatus according to claim 4, wherein said display control unit automatically updates display of the print instructing image or the transmission instructing image in accordance with an output of said output unit.

9. An image processing apparatus according to claim 1, wherein said display control unit displays the transmission instructing image for every transmission destination to display, in the transmission instructing area, the image lastly output to the transmission destination corresponding to the transmission instructing area, and wherein said instruction unit instructs to transmit the image by designating the transmission instructing area to designate the corresponding transmission destination.

10. An image pickup apparatus according to claim 4, wherein said display control unit displays the transmission instructing image for every transmission destination to display, in the transmission instructing area, the image lastly output to the transmission destination corresponding to the transmission instructing area, and wherein said instruction unit instructs to transmit the image by designating the transmission instructing area to designate the corresponding transmission destination.

11. An image processing method comprising the steps of:
reading out an image stored by a storage unit;
controlling to display, on a display unit, a reduced image of the image read out in said reading-out step and at least one of a print instructing image for instructing to print the image read out in said reading-out step and a transmission instructing image for instructing to transmit the image read out in said reading-out step;
instructing to print the image read out in said reading-out step, by designating a print instructing area having a print instruction identifier and including therein the print instructing image displayed in said controlling step and/or instructing to transmit the image read out by said reading-out step, by designating a transmission instructing area having a transmission instruction identifier and including therein the transmission instructing image displayed in said controlling step; and
outputting the image instructed to be printed or transmitted in said instructing step to a print apparatus or a transmission destination,
wherein said controlling step controls to display, as the print instructing image, a reduced image of an image which has been lastly output to the print apparatus is identified by the print instruction identifier and selected from among a plurality of stored images to be displayed, the print instruction identifier being displayed simultaneously with the print instructing image, and display, as the transmission instructing image, a reduced image of an image which has been lastly output to the transmission destination is identified by the transmission instruction identifier and selected from among the plurality of stored images to be displayed the transmission instruction identifier being displayed simultaneously with the transmission instructing image.

12. A computer-readable recording medium storing a computer program comprising a program code for causing a computer to execute an image processing method according to claim 11.

* * * * *